United States Patent
Kuo et al.

(10) Patent No.: US 8,357,345 B1
(45) Date of Patent: Jan. 22, 2013

(54) METHOD FOR REMOVING OXYGEN FROM ALUMINUM NITRIDE BY CARBON

(75) Inventors: Yang-Kuao Kuo, Taoyuan County (TW); Chia-Yi Hsiang, Taoyuan County (TW); Ching-Hui ChiangLin, Taoyuan County (TW); Te-Po Liu, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 0 days.

(21) Appl. No.: 13/237,076

(22) Filed: Sep. 20, 2011

(30) Foreign Application Priority Data

Aug. 4, 2011 (TW) .............................. 100127699 A

(51) Int. Cl.
| | |
|---|---|
| *C01B 21/072* | (2006.01) |
| *C23C 14/08* | (2006.01) |
| *C23C 14/00* | (2006.01) |
| *C04B 35/00* | (2006.01) |
| *B01D 5/00* | (2006.01) |

(52) U.S. Cl. ........ 423/412; 427/529; 427/524; 501/153; 501/98.4; 204/157.22

(58) Field of Classification Search ........................ None
See application file for complete search history.

(56) References Cited

U.S. PATENT DOCUMENTS

| | | | | |
|---|---|---|---|---|
| 4,847,221 A | * | 7/1989 | Horiguchi et al. | ........... 501/98.4 |
| 5,246,741 A | * | 9/1993 | Ouhata et al. | ................. 427/524 |

\* cited by examiner

*Primary Examiner* — Melvin C Mayes
*Assistant Examiner* — Guinever Gregorio
(74) *Attorney, Agent, or Firm* — Jackson IPG PLLC

(57) ABSTRACT

Disclosed is a method for removing oxygen from aluminum nitride by carbon. At first, an oven is provided. An aluminum nitride substrate is located in the oven. Nitrogen is introduced into the oven to form an atmosphere of nitrogen. The temperature is increased to the transformation point of the aluminum nitride substrate in the oven. Then, the heating is stopped and quenching is conducted in the oven. Carbon is introduced into the oven in the quenching. Thus, oxygen included in the aluminum nitride substrate reacts with the carbon to produce carbon monoxide or carbon dioxide. The carbon monoxide or carbon is released from the oven as well as the nitrogen. Thus, the aluminum nitride substrate is purified.

8 Claims, 3 Drawing Sheets

METHOD FOR REMOVING OXYGEN FROM ALUMINUM NITRIDE BY CARBON

BACKGROUND OF INVENTION

1. Field of Invention

The present invention relates to a method for removing oxygen from aluminum nitride by carbon and, more particularly, to a method for quenching an aluminum nitride substrate in an environment of carbon and nitrogen in an oven so that the carbon reduces oxygen contained in the oven and oxygen included in the aluminum nitride substrate into carbon monoxide or carbon dioxide, thus making a pure, quality aluminum nitride substrate.

2. Related Prior Art

LED devices have become popular recently because they operate at high efficiencies while consuming only a little electricity and are friendly to the environment.

Currently, most LED devices are used as backlights for cell phones. LED devices are however expected to replace conventional lights in the future. To this end, there is still a long way to go. There are problems related to the conversion efficiency, heat dissipation, color rendering, life and price for example.

Regarding the heat dissipation, an LED device converts a portion of electricity into light but converts the other portion of the electricity into heat. The heat would increase the temperature of the LED device excessively and therefore affect the efficiency, life and stability of the LED device should it not be dissipated fast.

Aluminum nitride ("AlN") is suitable for use as a heat sink and a substrate of an LED device because it exhibits a high heat transfer coefficient (170 W/mK), a high insulation resistivity and an excellent mechanical strength and is refractory and vibration-resistant. The heat transfer coefficient of an aluminum nitride substrate is much higher than the heat transfer coefficient (20 W/mK) of a conventional substrate made of sapphire ("$Al_2O_3$"). Hence, aluminum nitride substrates are getting more and more attention in the field of high-power LED devices.

As the heat transfer coefficient of an aluminum nitride substrate is 7 times higher than the heat transfer coefficient of a sapphire substrate, the aluminum nitride substrate increase the life of an LED device to 6,000 7,000 hours. The aluminum nitride could however be oxidized on the surface easily. That is, a thin layer of aluminum oxide could easily be formed on the surface of the aluminum nitride substrate. The thin layer of aluminum oxide compromises the quality and concentration of the aluminum nitride substrate and might even affect the heat dissipation.

The present invention is therefore intended to obviate or at least alleviate the problems encountered in prior art.

SUMMARY OF INVENTION

It is the primary objective of the present invention to provide a method for making a pure, quality aluminum nitride substrate.

To achieve the foregoing objective, the method includes the step of providing an oven. An aluminum nitride substrate is provided in the oven. Nitrogen is introduced into the oven to form an atmosphere of nitrogen. The temperature is increased to the transformation point of the aluminum nitride substrate in the oven. Then, the heating is stopped and quenching is conducted in the oven. Carbon is introduced into the oven during the quenching. Thus, oxygen included in the aluminum nitride substrate reacts with the carbon to produce carbon monoxide or carbon dioxide. The carbon monoxide or carbon dioxide is released from the oven as well as the nitrogen. Thus, the aluminum nitride substrate is purified.

In an aspect, the method further includes the steps of providing a nitrogen supply unit connected to the oven and providing a carbon supply unit connected to the oven. The oven includes an exhaust pipe formed thereon and at least one heating unit provided therein.

In another aspect, the nitrogen supply unit is connected to the carbon supply unit before they are connected to the oven.

In another aspect, the method further includes the step of providing valves among the oven, the nitrogen supply unit and the carbon supply unit.

In another aspect, the nitrogen supply unit provides nitrogen with concentration 2N to 6N.

In another aspect, the transformation point of the aluminum nitride substrate is higher than 1500° C.

In another aspect, the supply of the carbon starts when the temperature drops below 1500° C.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
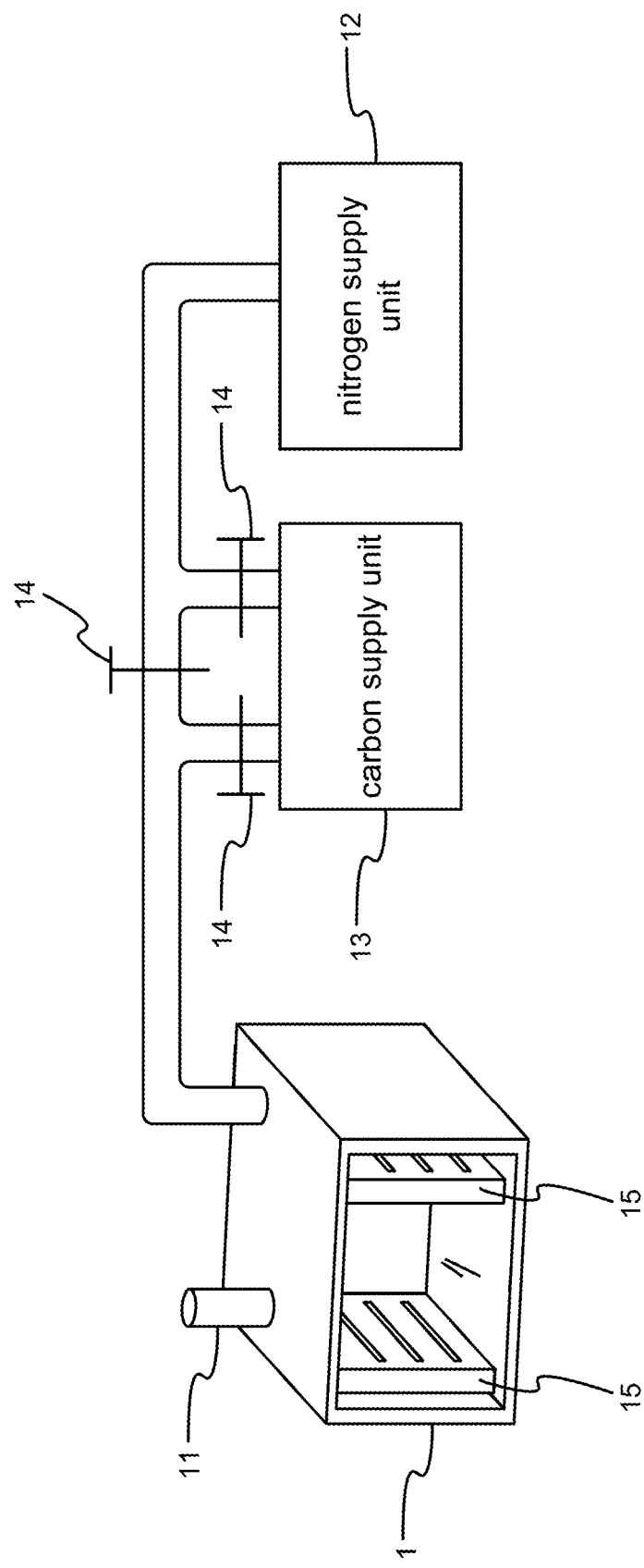
FIG. 1 is a perspective view of a system for executing a method for removing oxygen from aluminum nitride by carbon according to the preferred embodiment of the present invention.
Figure 2:
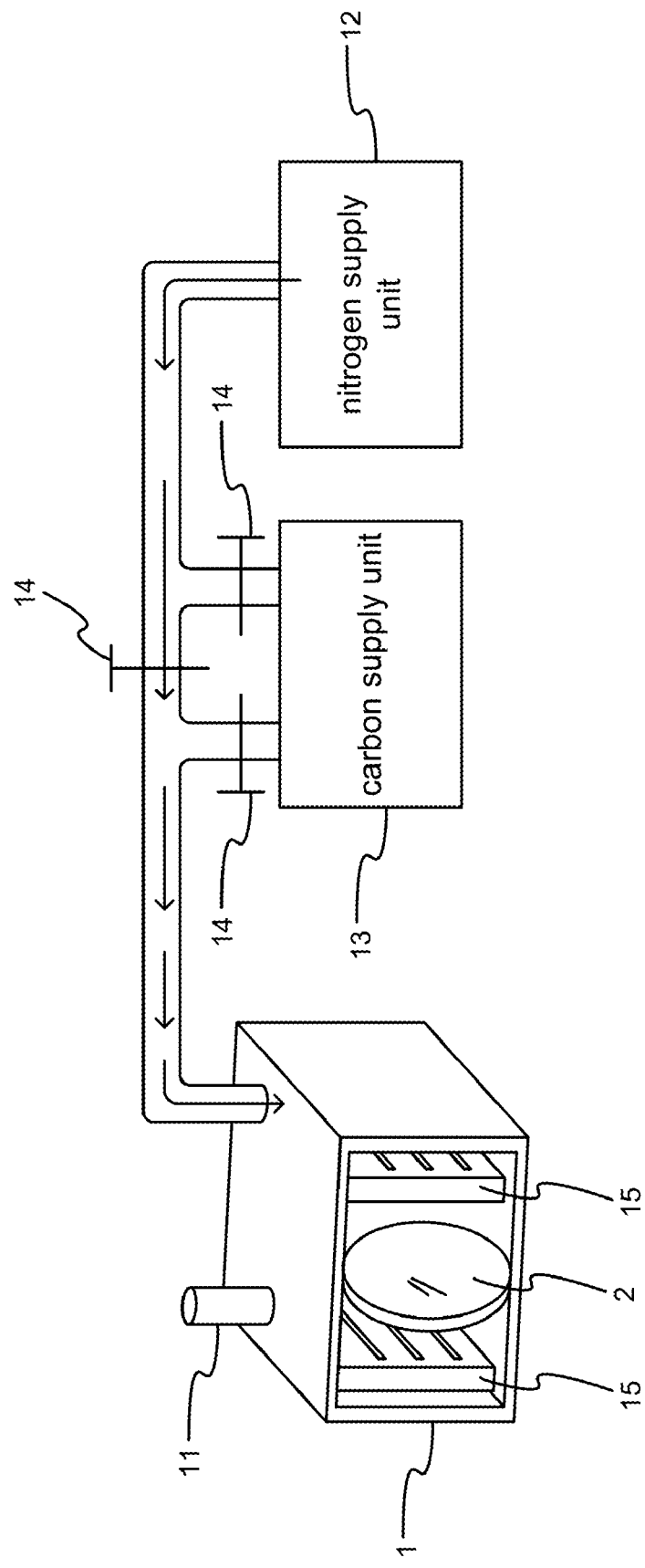
FIG. 2 is a perspective view of the system at another step than shown in FIG. 1.
Figure 3:
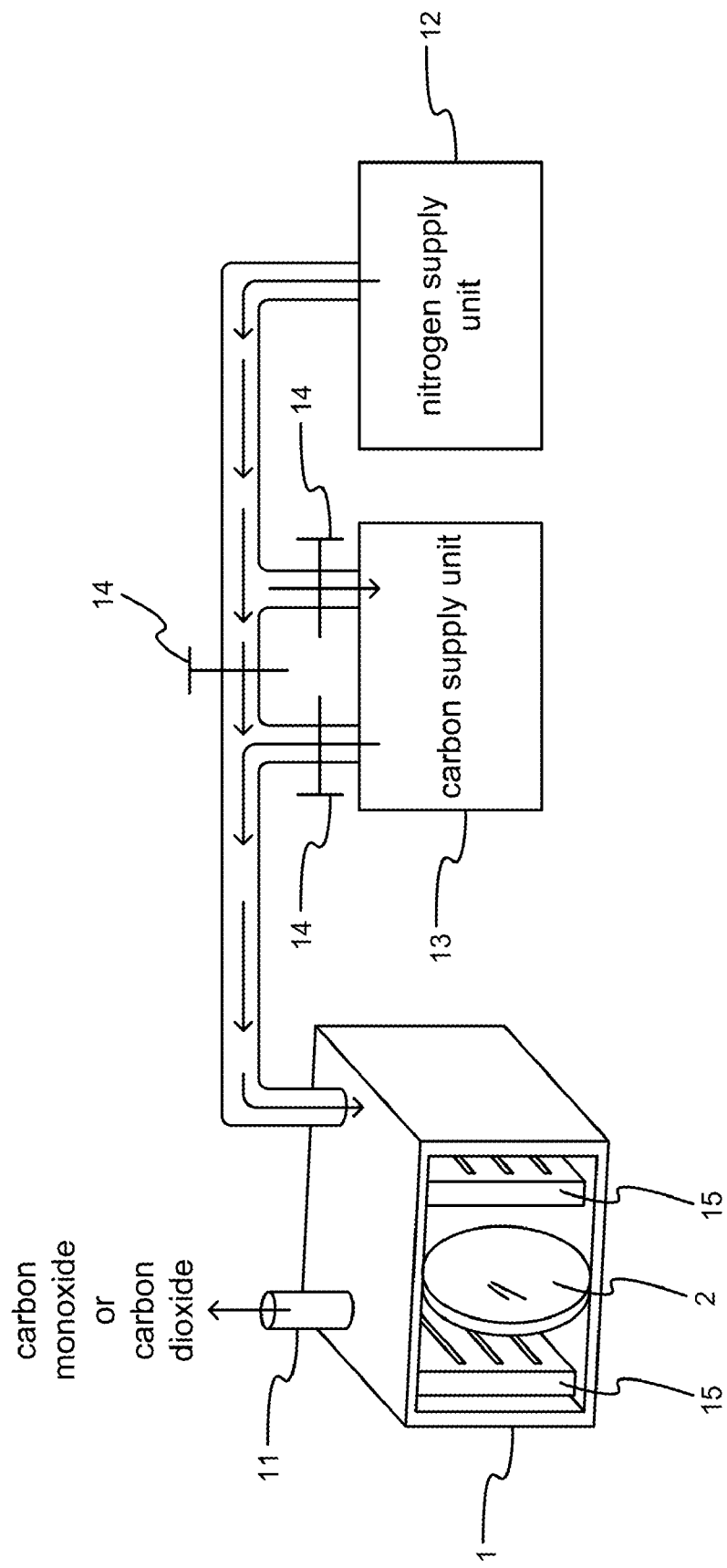
FIG. 3 is a perspective view of the system at another step than shown in FIG. 2.

Referring to FIGS. 1 through 3, there is shown a system for executing a method for removing oxygen from aluminum nitride by carbon according to the preferred embodiment of the present invention. The method includes three steps shown in FIGS. 1 through 3, respectively.

Referring to FIG. 1, the system includes an oven 1, a nitrogen supply unit 12 and a carbon supply unit 13. The oven 1 includes an exhaust pipe 11 formed thereon and two heating units 15 provided therein. The oven 1 is connected to both of the nitrogen supply unit 12 and the carbon supply unit 13. The nitrogen supply unit 12 is connected to the carbon supply unit 13 before they are connected to the oven 1. There are several valves 14 provided among the oven 1, the nitrogen supply unit 12 and the carbon supply unit 13. Each of the valves 14 is operable to open and close the nitrogen supply unit 12 and the carbon supply unit 13.

Referring to FIG. 2, an aluminum nitride substrate 2 is provided in the oven 1. One of the valves 14 is operable to allow nitrogen to travel into the oven 1 from the nitrogen supply unit 12 to produce a nitrogen atmosphere in the oven 1. The heating units 15 are turned on to increase the temperature to the transformation point of the aluminum nitride substrate 2 in the oven 1. The transformation point of the aluminum nitride substrate 2 is higher than 1500° C. The higher the concentration of the nitrogen in the nitrogen supply unit 12, the better. The concentration of the nitrogen in the nitrogen supply unit 12 is preferably 2N to 6N.

Referring to FIG. 3, the heating unit 15 of the oven 1 is turned off for quenching. During the quenching, another one of the valves 14 is operable to allow carbon to travel into the oven 1 from the carbon supply unit 13. Oxygen contained in the oven 1 and oxygen included in the aluminum nitride substrate 2 react with the carbon to produce carbon monoxide or carbon dioxide. The carbon monoxide or carbon dioxide is later released from the oven 1 through the exhaust pipe 11 together with the nitrogen. The carbon supply unit 13 is closed when the temperature drops below 1500° C. in the oven 1. Thus, a pure aluminum nitride substrate 2 is made.

As described above, the quenching is conducted in the atmosphere of the carbon and the nitrogen, the carbon reduces the oxygen into the carbon monoxide or carbon dioxide to avoid a thin layer of aluminum oxide on the surface of the aluminum nitride substrate 2. Thus, a pure, quality aluminum nitride substrate 2 is made.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for removing oxygen from aluminum nitride by carbon including the steps of:
    providing an oven;
    providing an aluminum nitride substrate in the oven,
    introducing only nitrogen into the oven to form an atmosphere of nitrogen and increasing the temperature to the transformation point of the aluminum nitride substrate in the oven; and
    stopping the heating and starting quenching in the oven, introducing carbon and nitrogen into the oven only during the quenching so that oxygen included in the aluminum nitride substrate reacts with the carbon to produce carbon monoxide or carbon dioxide, and releasing the carbon monoxide or carbon dioxide from the oven as well as the nitrogen, thus purifying the aluminum nitride substrate.

2. The method for removing oxygen from aluminum nitride by carbon according to claim 1, further including the steps of providing a nitrogen supply unit connected to the oven and providing a carbon supply unit connected to the oven, wherein the oven includes an exhaust pipe formed thereon and at least one heating unit provided therein.

3. The method for removing oxygen from aluminum nitride by carbon according to claim 2, wherein the nitrogen supply unit is connected to the carbon supply unit before they are connected to the oven.

4. The method of claim 3, wherein the carbon is induced to flow into the oven via flow of the nitrogen from the nitrogen supply unit into the carbon supply unit.

5. The method for removing oxygen from aluminum nitride by carbon according to claim 2, further including the step of providing valves among the oven, the nitrogen supply unit and the carbon supply unit.

6. The method for removing oxygen from aluminum nitride by carbon according to claim 1, wherein the nitrogen supply unit provides nitrogen with concentration 2N to 6N.

7. The method for removing oxygen from aluminum nitride by carbon according to claim 1, wherein the transformation point of the aluminum nitride substrate is higher than 1500° C.

8. The method for removing oxygen from aluminum nitride by carbon according to claim 1, wherein the supply of the carbon and nitrogen starts when the temperature drops below 1500° C.

\* \* \* \* \*